(12) United States Patent
Puchkarev et al.

(10) Patent No.: US 12,116,014 B2
(45) Date of Patent: Oct. 15, 2024

(54) LATERAL GAP PLANNING FOR AUTONOMOUS VEHICLES

(71) Applicant: Waymo LLC, Mountain View, CA (US)

(72) Inventors: Victor Puchkarev, Santa Cruz, CA (US); Alexander Ruben Stacey McCarthy, San Francisco, CA (US); Aleix Paris i Bordas, San Francisco, CA (US); Jennifer Iglesias, San Francisco, CA (US); Allison Thackston, San Jose, CA (US); Xinrui Wang, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 126 days.

(21) Appl. No.: 17/388,843

(22) Filed: Jul. 29, 2021

(65) Prior Publication Data
US 2023/0030104 A1    Feb. 2, 2023

(51) Int. Cl.
*B60W 60/00*    (2020.01)
*B60W 50/02*    (2012.01)

(52) U.S. Cl.
CPC .... *B60W 60/0027* (2020.02); *B60W 50/0205* (2013.01); *B60W 2552/05* (2020.02); *B60W 2554/801* (2020.02); *B60W 2555/20* (2020.02)

(58) Field of Classification Search
CPC .................................................. B60W 60/0027
See application file for complete search history.

(56) References Cited

U.S. PATENT DOCUMENTS

| | | |
|---|---|---|
| 9,804,594 B2 | 10/2017 | Gariepy et al. |
| 10,671,079 B2 | 6/2020 | Russell et al. |
| 10,703,361 B2 | 7/2020 | Prokhorov |
| 2020/0361471 A1 | 11/2020 | Choi et al. |
| 2021/0061350 A1 | 3/2021 | Kinoshita et al. |
| 2021/0094540 A1* | 4/2021 | Bagschik ............... G06V 20/58 |
| 2021/0183181 A1* | 6/2021 | Lee .......................... G01S 19/01 |
| 2021/0295171 A1* | 9/2021 | Kamenev ................. G06T 7/70 |
| 2022/0135029 A1* | 5/2022 | Poubel Orenstein .. G08G 1/163 |
| | | 701/301 |
| 2022/0161787 A1* | 5/2022 | Kinoshita ............. B60W 40/04 |
| 2023/0011475 A1* | 1/2023 | Mori ..................... G01S 13/865 |
| 2023/0012853 A1* | 1/2023 | Tam ..................... G05D 1/0223 |

* cited by examiner

*Primary Examiner* — Imran K Mustafa
(74) *Attorney, Agent, or Firm* — Botos Churchill IP Law (57) ABSTRACT

Aspects of the disclosure provide for controlling an autonomous vehicle. For instance, a trajectory for the autonomous vehicle to traverse in order to follow a route to a destination may be generated. A first error value for a boundary of an object, a second error value for a location of the autonomous vehicle, a third error value for a predicted future location of the object may be received. An uncertainty value for the object may be determined by combining the first error value, the second error value, and the third error value. A lateral gap threshold for the object may be determined based on the uncertainty value. The autonomous vehicle may be controlled in an autonomous driving mode based on the lateral gap threshold for the object.

21 Claims, 10 Drawing Sheets

LATERAL GAP PLANNING FOR AUTONOMOUS VEHICLES

BACKGROUND

Autonomous vehicles, for instance, vehicles that may not require a human driver, can be used to aid in the transport of passengers or items from one location to another. Such vehicles may operate in a fully autonomous mode where passengers may provide some initial input, such as a pickup or destination location, and the autonomous vehicle maneuvers itself to that location. Thus, such vehicles may be largely dependent on systems that are capable of determining the location of the autonomous vehicle at any given time, as well as detecting and identifying objects external to the autonomous vehicle, such as other vehicles, stop lights, pedestrians, etc.

In some instances, an autonomous vehicle's planning system, which generates trajectories for an autonomous vehicle to follow for some period of time into the future, may implement lateral gap thresholds in order to allow the autonomous vehicle to safely drive next to other road users. If such lateral thresholds cannot be met, the autonomous vehicle may be slowed down or stopped. In many instances, setting the required lateral gap to be relatively large to avoid potential collisions may be possible.

BRIEF SUMMARY

Aspects of the disclosure provide a method for controlling an autonomous vehicle. The method includes receiving, by one or more processors, a first error value for a boundary of an object, a second error value for a location of the autonomous vehicle, and a third error value for a predicted future location of the object; determining, by the one or more processors, an uncertainty value for the object by combining the first error value, the second error value, and the third error value; determining, by the one or more processors, a lateral gap threshold for the object based on the uncertainty value; and controlling, by the one or more processors, the autonomous vehicle in an autonomous driving mode based on the lateral gap threshold for the object.

In one example, the first error value, the second error value, and the third error value are standard deviation values. In another example, combining the first error value, the second error value, and the third error value includes taking a square root of a sum of squares of the first error value, the second error value, and the third error value. In another example, the first error value, the second error value, and the third error value are mean values. In this example, combining the first error value, the second error value, and the third error value includes summing the first error value, the second error value, and the third error value. In another example, determining the lateral gap threshold includes: identifying a baseline lateral gap threshold and adding the uncertainty value to the baseline lateral gap threshold. In this example, identifying the baseline lateral gap threshold is based on current driving conditions. In addition, the current driving conditions includes whether the autonomous vehicle is currently precipitating in a driving environment of the autonomous vehicle. In addition or alternatively, the current driving conditions includes whether the autonomous vehicle is driving in an urban area. In addition or alternatively, the current driving conditions includes whether the autonomous vehicle is driving in a suburban area. In addition or alternatively, identifying the baseline lateral gap threshold is based on a type of the object. In addition or alternatively, determining the lateral gap threshold further includes identifying an interaction threshold corresponding to a predetermined percentage of an expected interaction rate with objects. In this example, identifying the interaction threshold is based on a type of the object. In addition or alternatively, controlling the autonomous vehicle in further includes: attempting to solve for a trajectory that meets the lateral gap threshold for the object and when a trajectory that meets the lateral gap threshold for the object cannot be solved for, adjusting the baseline lateral gap threshold to determine an adjusted lateral gap threshold until a trajectory that meets the adjusted lateral gap threshold for the object is found.

Other aspects of the disclosure provide a system for controlling an autonomous vehicle. The system includes one or more processors configured to: receive a first error value for a boundary of an object, a second error value for a location of the autonomous vehicle, and a third error value for a predicted future location of the object; determine an uncertainty value for the object by combining the first error value, the second error value, and the third error value; determine a lateral gap threshold for the object based on the uncertainty value; and control the autonomous vehicle in an autonomous driving mode based on the lateral gap threshold for the object.

In one example, the one or more processors are further configured to determine the lateral gap threshold by identifying a baseline lateral gap threshold and adding the uncertainty value to the baseline lateral gap threshold. In this example, the one or more processors are further configured to identify the baseline lateral gap threshold further based on current driving conditions. In addition or alternatively, the one or more processors are further configured to the baseline lateral gap threshold further based on a type of the object. In another example, the one or more processors are further configured to determine the lateral gap threshold by identifying an interaction threshold corresponding to a predetermined percentage of an expected interaction rate with objects. In another example, the one or more processors are further configured to control the autonomous vehicle in by attempting to solve for a trajectory that meets the lateral gap threshold for the object and when a trajectory that meets the lateral gap threshold for the object cannot be solved for, adjusting the baseline lateral gap threshold to determine an adjusted lateral gap threshold until a trajectory that meets the adjusted lateral gap threshold for the object is found.

DETAILED DESCRIPTION

Overview

The technology relates to planning for lateral gaps between autonomous vehicles and other objects in order to control such autonomous vehicles in a safe and practical manner. For instance, the autonomous vehicle's planning system, which generates trajectories for an autonomous vehicle to follow for some period of time into the future, may implement lateral gap thresholds in order to allow the autonomous vehicle to safely drive next to other road users. If such lateral thresholds cannot be met, the autonomous vehicle may be slowed down or stopped. In many instances, setting the required lateral gap to be relatively large to avoid potential collisions may be possible. However, in some driving situations, such as dense urban environments, such thresholds may limit progress of the autonomous vehicle and in some instances may even cause the autonomous vehicle to become stranded (e.g. unable to make forward progress). Thus, achieving a balance between safety and practicality by determining just how small a lateral gap threshold can be while still maintaining acceptable margins of safety is critical to enabling operation of autonomous vehicles in such situations.

One approach for addressing this issue involves adjusting the autonomous vehicle's speed based on a predicted lateral gap between the autonomous vehicle and an object. In other words, as the predicted lateral distance between the object and the autonomous vehicle decreases, the autonomous vehicle's planning system may enable the autonomous vehicle to travel at slower speeds. At the same time, as the predicted lateral distance between an object and the autonomous vehicle increases, the autonomous vehicle's planning system may enable the autonomous vehicle to travel at faster speeds.

However, predicting the lateral gap between the autonomous vehicle and the object may be dependent upon measurements, predictions, and estimations which are each subject to errors. In other words, the inputs to the autonomous vehicle's planning system relating to an object's boundaries (e.g. bounding box) and predicted future locations (e.g. behavior prediction) as well as the autonomous vehicle's location (e.g. cross-track error) may not be perfect. Each of these inputs may have potential noise, errors, or uncertainties inherent in the systems and algorithms used to make such measurements or determinations.

For instance, the autonomous vehicle's perception system may provide the autonomous vehicle's planning system with information about objects detected in the autonomous vehicle's environment. These objects may include other road users such as other vehicles, pedestrians, bicyclists, etc. The information may include the object's position as well as a three-dimensional polyhedron or two-dimensional polygon representing the boundaries of the object (e.g. a two-dimensional or three-dimensional bounding box). The bounding box or polygon may be represented as a statistical model. The precision of the measurements of the bounding box may be represented as a distribution of possible values having a mean and standard deviation which may suggest how much smaller the bounding box or polygon could be relative to the object.

In addition, the difference between the autonomous vehicle's estimated and actual location in the world may be defined as the autonomous vehicle's cross-track error. For instance, the autonomous vehicle's computing devices may determine the autonomous vehicle's cross-track error as a distribution or statistical model of where the autonomous vehicle currently is versus where the autonomous vehicle expects to be based on location information from a location system of the autonomous vehicle. In this regard, the mean and standard deviation of the cross-track error may be determined.

In addition, for each detected road user object, based on the output of the autonomous vehicle's perception system, a behavior prediction system may output a prediction of where the object is expected to be at various points in time in the future. In this regard, for each road user object, the behavior prediction system may output multiple behavior predictions with individual likelihoods.

The distributions for each of these values (e.g. error values) may be combined in any number of ways to determine an uncertainty for an object. For example, if the distributions are all Gaussian distributions, the mean and standard deviations may be combined statistically. As such, these may be combined by summing the means and by taking the square root of a sum of squares of the standard deviations. This uncertainty may be added to a baseline lateral gap threshold for the type of the object in order to determine a lateral gap threshold. Each baseline lateral gap threshold may be determined by human operators based on acceptable driving behaviors for the autonomous vehicle.

Confidence values for the lateral gap thresholds for each object may be determined based on an expected interaction rate and a maximum number of interactions that do not meet the lateral gap threshold. The expected interaction rate may be determined offline from analysis of historical driving information in the same, similar, or all geographic locations to identify how often autonomous vehicles come within a predetermined distance of each type of road user. In this regard, a confidence value may represent a percentage of interactions with a particular type of object during which the autonomous vehicle may not meet the lateral gap threshold. In other words, the confidence value defines a rule that the autonomous vehicle maintains a lateral gap to external objects such that the predicted incidents per mile of not maintaining this lateral gap due to uncertainty does not exceed the confidence value. Confidence values may be different for different types of objects having different uncertainties as determined above.

The autonomous vehicle's planning system may then attempt to solve for a trajectory that maintains the confidence value as well as other typical constraints. For instance, the planning system may attempt to ensure that it is at least as confident as the confidence value that the autonomous vehicle will not violate the lateral gap threshold given the current uncertainties. If a trajectory can be found, this trajectory can be used to control the autonomous vehicle in an autonomous driving mode. If a trajectory cannot be found, certain components of the constraints, including the confidence value, can be adjusted. For example, the confidence value can be adjusted by reducing the lateral gap threshold component of the confidence value.

The features described herein may allow autonomous vehicles to plan for lateral gaps between autonomous vehicles and other objects in order to control such autonomous vehicles in a safe and practical manner. In addition, the features described herein may provide many other benefits. For instance, if the lateral gap threshold component of the confidence values is becoming very large, this may be a signal that there is a problem with the inputs to that component. Moreover, by reviewing the calculation of the uncertainty value, the system which is causing the problem may be readily identified and efforts to improve this system can be focused accordingly. In addition, as the perception, positioning, and behavior prediction systems improve (e.g. become more precise), the features described herein take advantage of these improvements automatically as the lateral gap threshold will be reduced and the autonomous vehicle will be able to make more progress, at faster speeds, in narrower situations, while maintaining the same level of safety.

Example Systems

Figure 1:
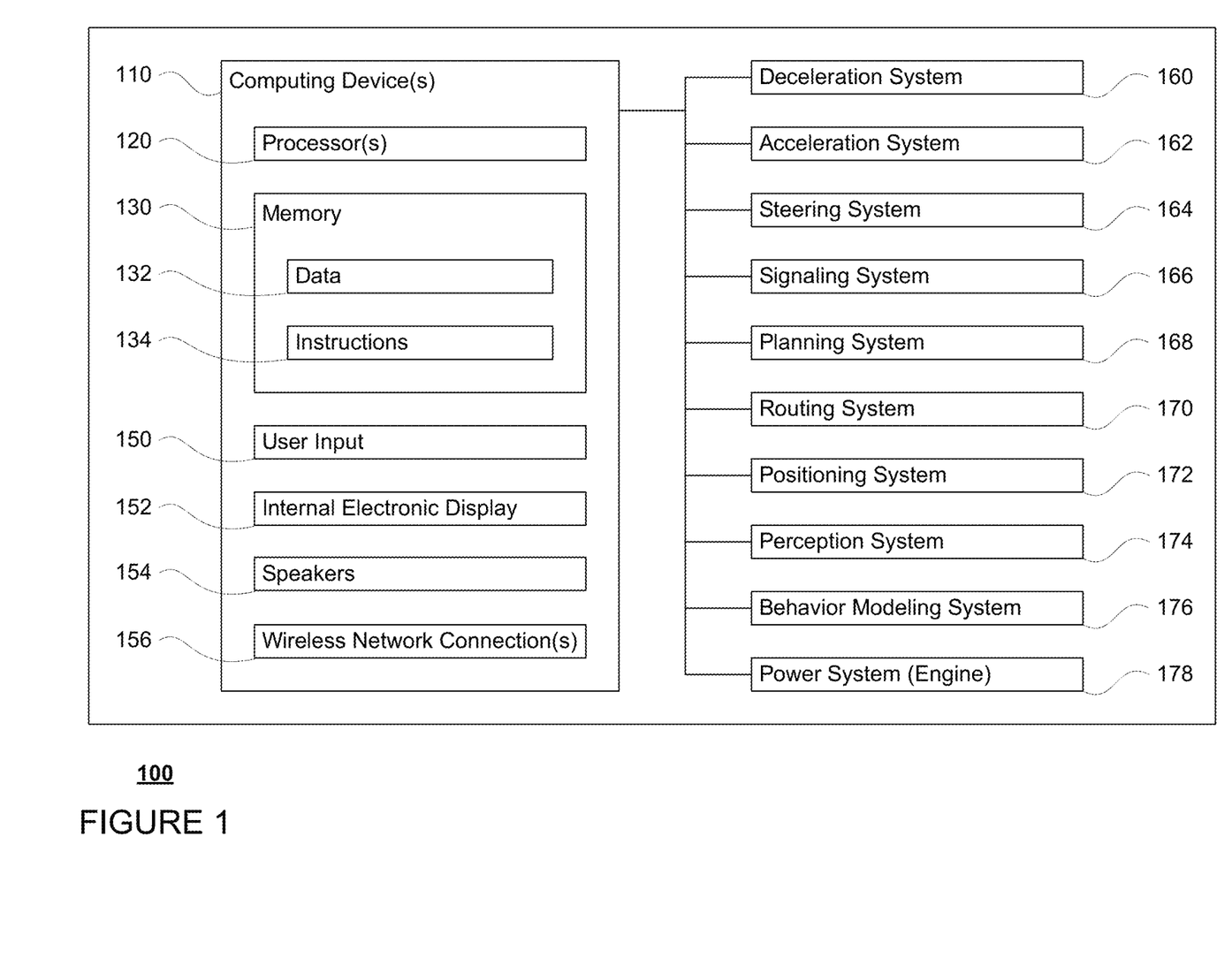
FIG. 1 is a functional diagram of an example vehicle in accordance with an exemplary embodiment.

As shown in FIG. 1, an autonomous vehicle 100 in accordance with one aspect of the disclosure includes various components. While certain aspects of the disclosure are particularly useful in connection with specific types of vehicles, the autonomous vehicle may be any type of vehicle including, but not limited to, cars, trucks, motorcycles, buses, recreational vehicles, etc. The autonomous vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor.

Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., one or more button, mouse, keyboard, touch screen and/or microphone), various electronic displays (e.g., a monitor having a screen or any other electrical device that is operable to display information), and speakers 154 to provide information to a passenger of the autonomous vehicle 100 or others as needed. For example, electronic display 152 may be located within a cabin of autonomous vehicle 100 and may be used by computing devices 110 to provide information to passengers within the autonomous vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may be part of an autonomous control system for the autonomous vehicle 100 and may be capable of communicating with various components of the autonomous vehicle in order to control the autonomous vehicle in an autonomous driving mode. For example, returning to FIG. 1, the computing devices 110 may be in communication with various systems of autonomous vehicle 100, such as deceleration system 160, acceleration system 162, steering system 164, signaling system 166, planning system 168, routing system 170, positioning system 172, perception system 174, behavior prediction system 176, and power system 178 in order to control the movement, speed, etc. of autonomous vehicle 100 in accordance with the instructions 134 of memory 130 in the autonomous driving mode.

As an example, the computing devices 110 may interact with deceleration system 160 and acceleration system 162 in order to control the speed of the autonomous vehicle. Similarly, steering system 164 may be used by computing devices 110 in order to control the direction of autonomous vehicle 100. For example, if autonomous vehicle 100 is configured for use on a road, such as a car or truck, the steering system may include components to control the angle of wheels to turn the autonomous vehicle. The computing devices 110 may also use the signaling system 166 in order to signal the autonomous vehicle's intent to other drivers or vehicles, for example, by lighting turn signals or brake lights when needed.

Routing system 170 may be used by the computing devices 110 in order to generate a route to a destination using map information. Planning system 168 may be used by computing devices 110 in order to generate short-term trajectories that allow the autonomous vehicle to follow routes generated by the routing system. In this regard, the planning system 168 and/or routing system 166 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device), pullover spots, vegetation, or other such objects and information.

Figure 2:
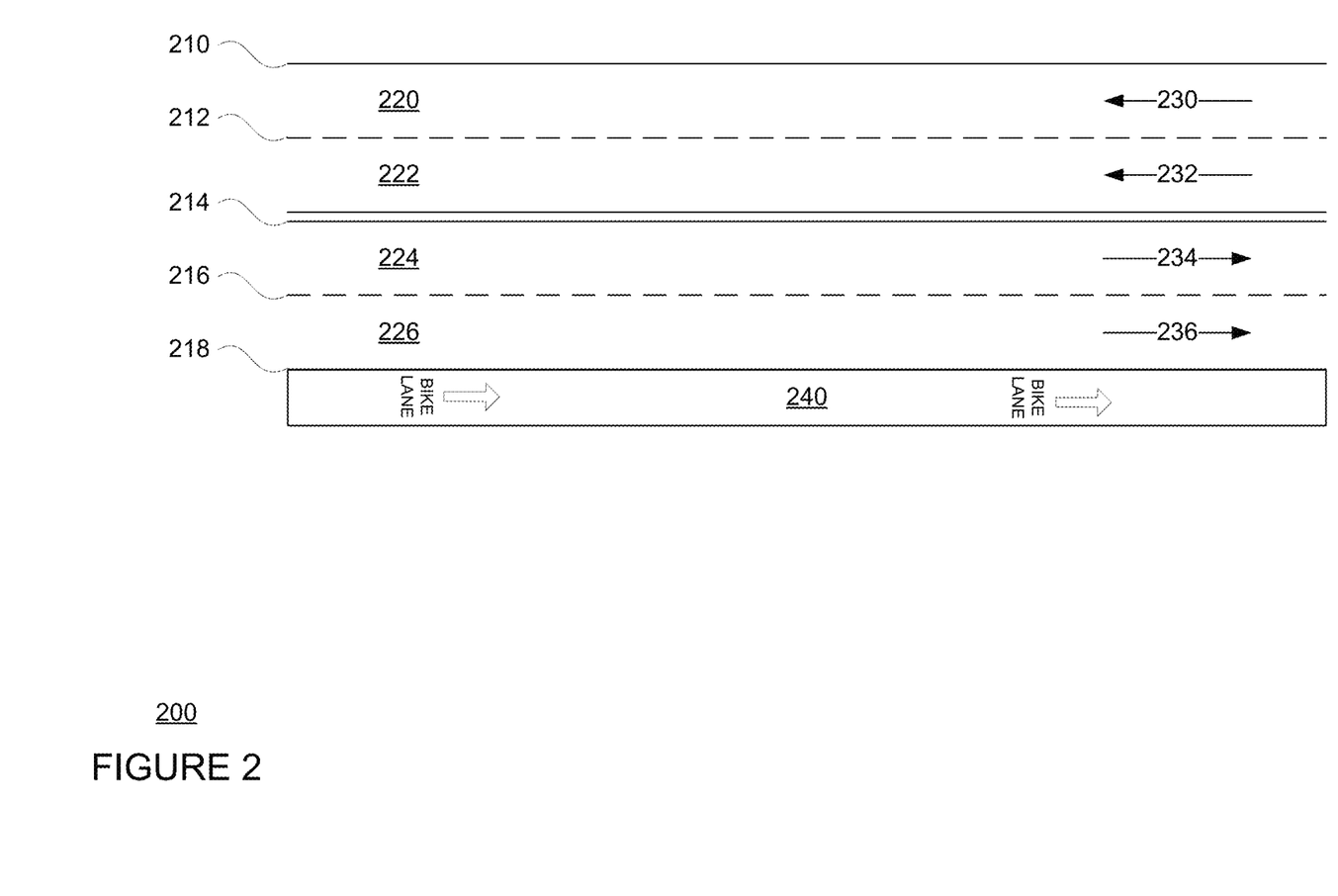
FIG. 2 is an example representation of map information in accordance with aspects of the disclosure.

FIG. 2 is an example of map information 200 for a small section of roadway. The map information 200 that includes information identifying the shape, location, and other characteristics of lane markers or lane lines 210, 212, 214, 216, 218 which define lanes 220, 222, 224, 226. In this example, lane lines 214 represent double yellow lane lines, lane lines 212, 216 represent dashed while lane lines, and lane lines 210, 218 represent fog lines. In addition to the aforementioned features and information, the map information may also include information that identifies the direction of traffic for each lane, represented by arrows 230, 232, 234, 236. Here, lanes 220, 222 may be considered neighboring lanes as they are adjacent to one another and have the same direction of traffic. Similarly, lanes 224, 226 may also be considered neighboring lanes as they are adjacent to one another and have the same direction of traffic. In addition, because the different directions of traffic, lanes 224, 226 may be considered opposing lanes of traffic to lanes 220, 222. Similarly, lanes 220, 222 may be considered opposing lanes of traffic to lanes 224, 226. The map information may also include other information that allows the computing devices 110 to determine whether the vehicle has the right of way to complete a particular maneuver (i.e. complete a turn or cross a lane of traffic or intersection).

In addition to information about lanes, the map information may include additional details such as the characteristics (e.g. shape, location, etc.) of traffic lights, signs (such as stop signs, yield signs, speed limit signs, road signs, and so on), crosswalks, sidewalks, curbs, buildings or other monuments, etc. For instance, as shown in FIG. 2, the map information identifies the shape and location of a bicycle lane 240.

In addition to the aforementioned physical feature information, the map information may be configured as a roadgraph which includes a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the autonomous vehicle 100 must be moving in in order to follow the edge (i.e. a direction of traffic or traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 166 may use the aforementioned map information to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the autonomous vehicle, etc. Each route may include a list of a plurality of nodes and edges which the autonomous vehicle can use to reach the destination. Routes may be recomputed periodically as the autonomous vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g. because it is faster) and therefore be preferable.

Positioning system 170 may be used by computing devices 110 in order to determine the autonomous vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the autonomous vehicle. The location of the autonomous vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/speed detection device to determine the direction and speed of the autonomous vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

The perception system 174 also includes one or more components for detecting objects external to the autonomous vehicle such as other vehicles, obstacles in the roadway, traffic signals, signs, trees, etc. For example, the perception system 174 may include LIDARs, sonar, radar, cameras and/or any other detection devices that record data which may be processed by the computing devices of the computing devices 110. In the case where the autonomous vehicle is a passenger vehicle such as a minivan, the minivan may include a laser or other sensors mounted on the roof or other convenient location.

Figure 3:
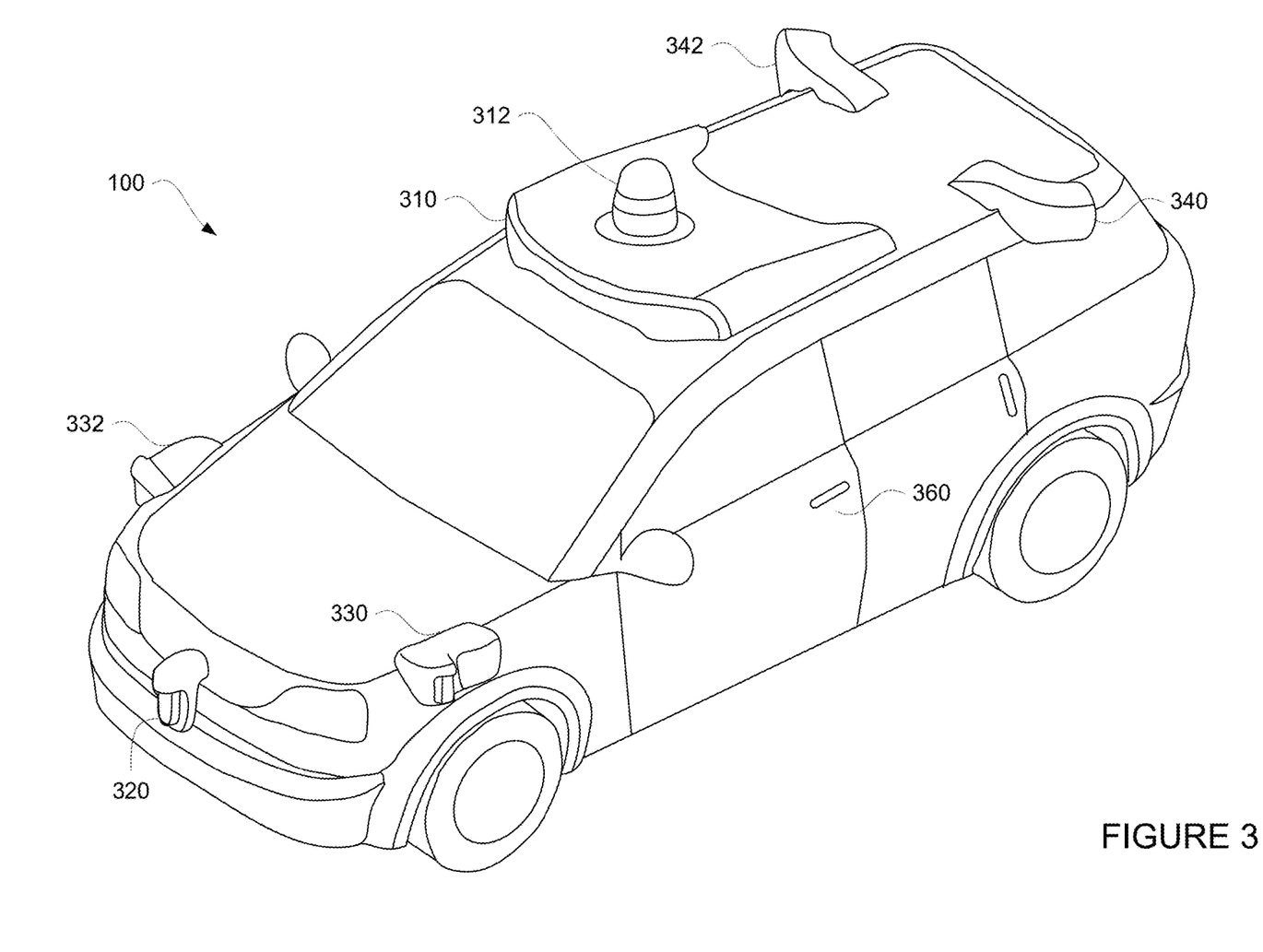
FIG. 3 is an example external view of a vehicle in accordance with aspects of the disclosure.

For instance, FIG. 3 is an example external view of autonomous vehicle 100. In this example, roof-top housing 310 and dome housing 312 may include a LIDAR sensor as well as various cameras and radar units. In addition, housing 320 located at the front end of autonomous vehicle 100 and housings 330, 332 on the driver's and passenger's sides of the autonomous vehicle may each store a LIDAR sensor. For example, housing 330 is located in front of driver door 360. Autonomous vehicle 100 also includes housings 340, 342 for radar units and/or cameras also located on the roof of autonomous vehicle 100. Additional radar units and cameras (not shown) may be located at the front and rear ends of autonomous vehicle 100 and/or on other positions along the roof or roof-top housing 310.

The computing devices 110 may be capable of communicating with various components of the autonomous vehicle in order to control the movement of autonomous vehicle 100 according to primary vehicle control code of memory of the computing devices 110. For example, returning to FIG. 1, the computing devices 110 may include various computing devices in communication with various systems of autonomous vehicle 100, such as deceleration system 160, acceleration system 162, steering system 164, signaling system 166, planning system 168, routing system 170, positioning system 172, perception system 174, behavior prediction system 176, and power system 178 (i.e. the autonomous vehicle's engine or motor) in order to control the movement, speed, etc. of autonomous vehicle 100 in accordance with the instructions 134 of memory 130.

The various systems of the autonomous vehicle may function using autonomous vehicle control software in order to determine how to and to control the autonomous vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. Such objects may include other road users including other vehicles, pedestrians, bicyclists, etc. The characteristics may include location, type, heading, orientation, speed, acceleration, change in acceleration, size, shape, etc. In this regard, information may include the object's position as well as a three-dimensional polyhedron or two-dimensional polygon representing the boundaries of the object (e.g. a two-dimensional or three-dimensional bounding box). The bounding box or polygon may be represented as a statistical model. The precision of the measurements of the bounding box may be represented as a distribution of possible values having a mean and standard deviation which may suggest how much smaller the bounding box or polygon could be relative to the object.

In some instances, characteristics may be input into a behavior prediction system software module of the behavior prediction system 176 which uses various behavior prediction models based on object type to output a predicted future behavior for a detected object. For instance, the behavior prediction system 176 may output a prediction of where the object is expected to be at various points in time in the future. In this regard, for each road user object, the behavior prediction system 176 may output multiple behavior predictions with individual likelihoods. The error or uncertainty of these predictions may generally increase over time (e.g. into the future). In this regard, the predictions may be defined as a Gaussian distribution over time with mean and standard deviations at each point in time.

In other instances, the characteristics may be put into one or more detection system software modules, such as a traffic light detection system software module configured to detect the states of known traffic signals, construction zone detection system software module configured to detect construction zones from sensor data generated by the one or more sensors of the autonomous vehicle as well as an emergency vehicle detection system configured to detect emergency vehicles from sensor data generated by sensors of the autonomous vehicle. Each of these detection system software modules may use various models to output a likelihood of a construction zone or an object being an emergency vehicle.

Detected objects, predicted future behaviors, various likelihoods from detection system software modules, the map information identifying the autonomous vehicle's environment, position information from the positioning system 170 identifying the location and orientation of the autonomous vehicle, a destination location or node for the autonomous vehicle as well as feedback from various other systems of the autonomous vehicle may be input into a planning system software module of the planning system 168. The planning system 168 may use this input to generate trajectories for the autonomous vehicle to follow for some brief period of time into the future based on a route generated by a routing module of the routing system 170. In this regard, the trajectories may define the specific characteristics of acceleration, deceleration, speed, etc. to allow the autonomous vehicle to follow the route towards reaching a destination. A control system software module of the computing devices 110 may be configured to control movement of the autonomous vehicle, for instance by controlling braking, acceleration and steering of the autonomous vehicle, in order to follow a trajectory.

The computing devices 110 may control the autonomous vehicle in an autonomous driving mode by controlling various components. For instance, by way of example, the computing devices 110 may navigate the autonomous vehicle to a destination location completely autonomously using data from the detailed map information and planning system 168. The computing devices 110 may use the positioning system 170 to determine the autonomous vehicle's location and perception system 174 to detect and respond to objects when needed to reach the location safely. Again, in order to do so, computing devices 110 and/or planning system 168 may generate trajectories and cause the autonomous vehicle to follow these trajectories, for instance, by causing the autonomous vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of autonomous vehicle 100 by steering system 164), and signal such changes (e.g., by lighting turn signals) using the signaling system 166. Thus, the acceleration system 162 and deceleration system 160 may be a part of a drivetrain that includes various components between an engine of the autonomous vehicle and the wheels of the autonomous vehicle. Again, by controlling these systems, computing devices 110 may also control the drivetrain of the autonomous vehicle in order to maneuver the autonomous vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 10:
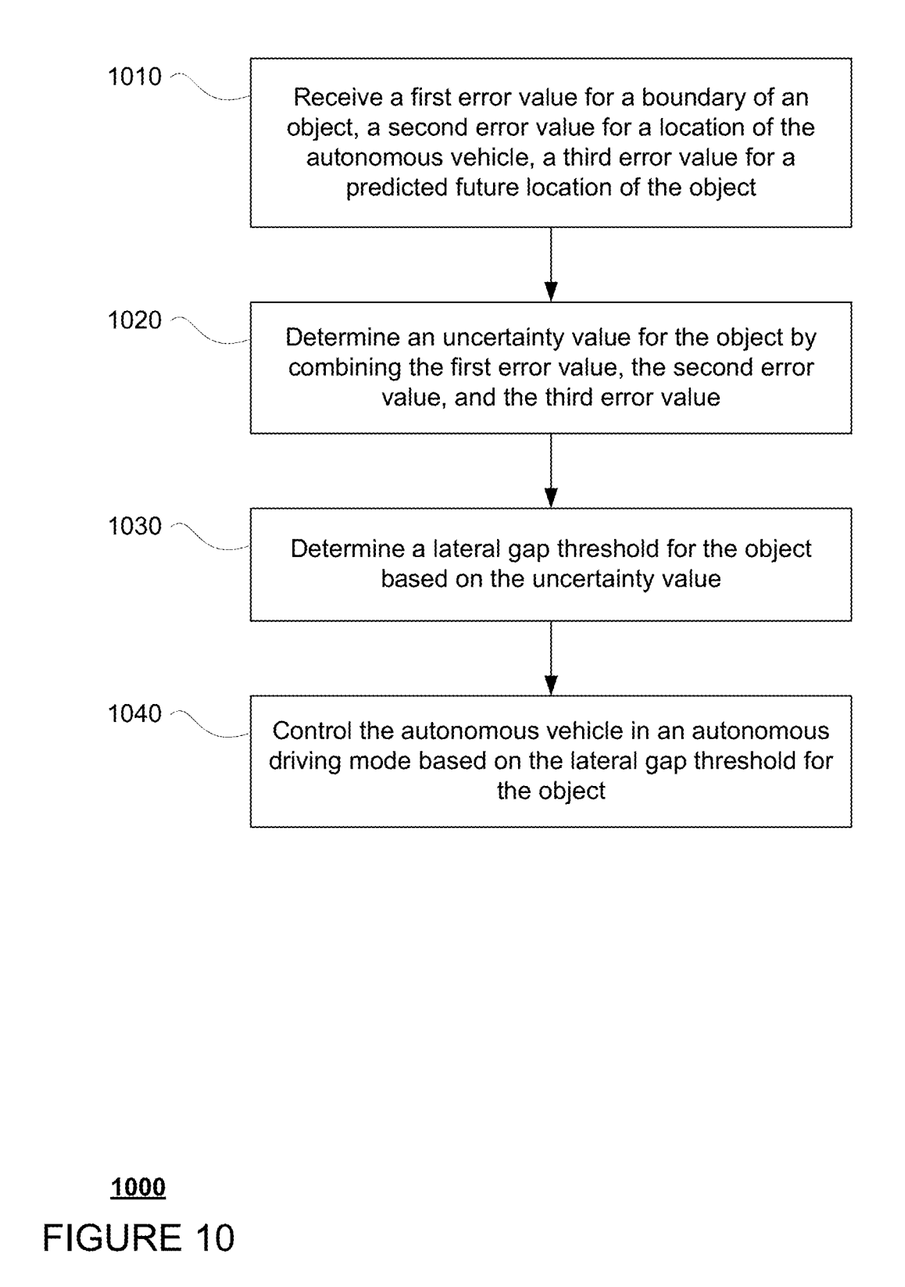
FIG. 10 is an example flow diagram in accordance with aspects of the disclosure.

FIG. 10 is an example flow diagram 1000 for controlling an autonomous vehicle, which may be performed by one or more processors of one or more computing devices, such as one or more of the processors 120 of the computing devices 110, planning system 168, and/or other processors of the various other systems of the autonomous vehicle 100 discussed above. At block 1010, a first error value for a boundary of an object, a second error value for a location of the autonomous vehicle, and a third error value for a predicted future location of the object are received.

As noted above, predicting the lateral gap between the autonomous vehicle and the object may be dependent upon measurements, predictions, and estimations which are each subject to errors. In other words, the inputs to the planning system 168 relating to an object's boundaries (e.g. predicted bounding box) and predicted future locations (e.g. behavior prediction) as well as the autonomous vehicle's location (e.g. cross-track error) may not be perfect. Each of these inputs may have potential noise, errors, or uncertainties inherent in the systems and algorithms used to make such measurements or determinations provided as error distributions.

For instance, the perception system 174 may provide the planning system 168 with information about objects detected in the autonomous vehicle's environment. As noted above, such objects may include other road users including other vehicles, pedestrians, bicyclists, etc. The information may include the object's position as well as a three-dimensional polyhedron or two-dimensional polygon representing the boundaries of the object (e.g. a two-dimensional or three-dimensional bounding box). The bounding box or polygon may be represented as a statistical model. The precision of the measurements of the bounding box may be represented as an error distribution or a distribution of possible values having a mean and standard deviation which may suggest how much smaller the bounding box or polygon could be relative to the object.

Figure 4:
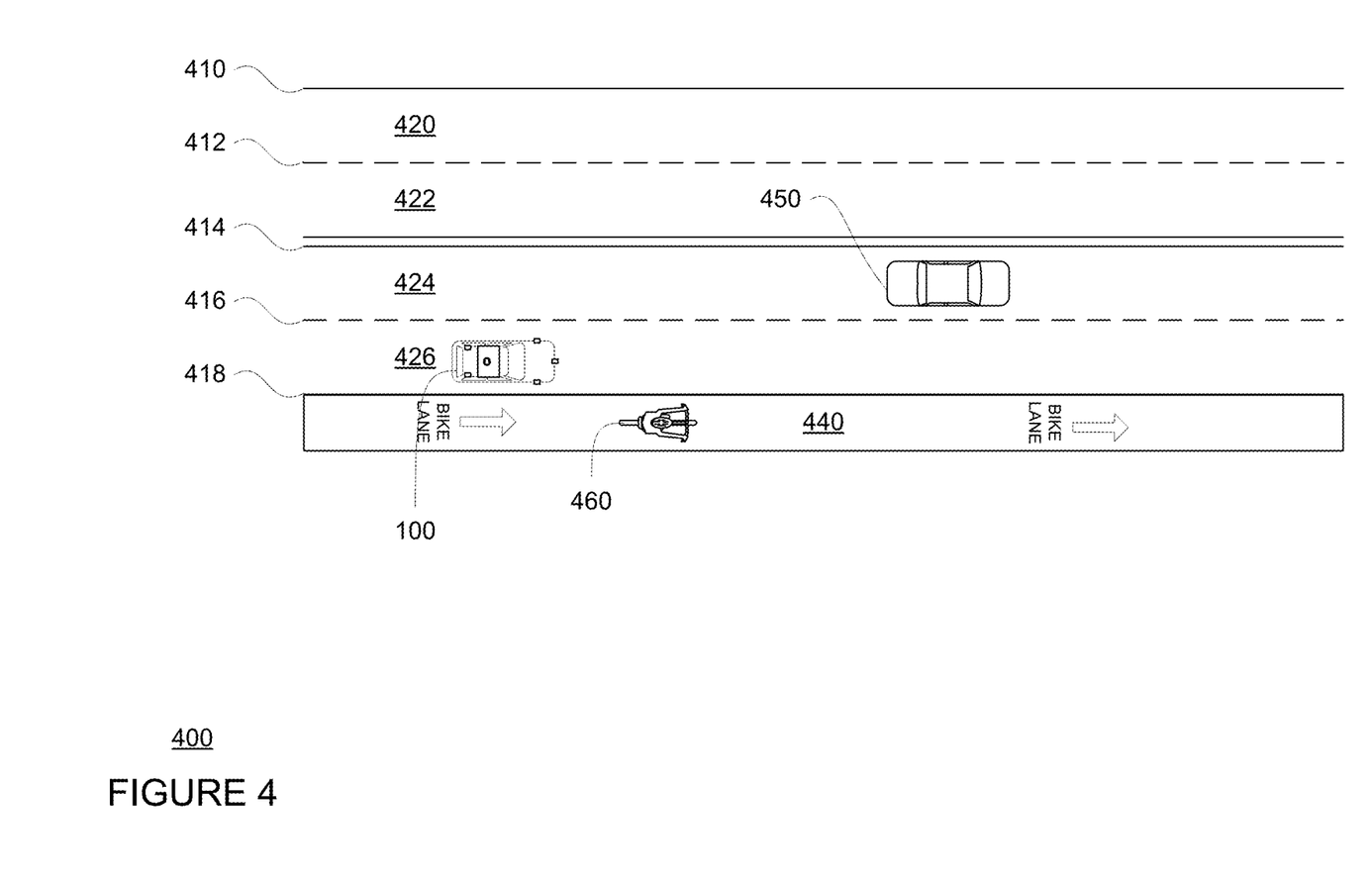
FIG. 4 is an example representation of a top-down view of a section of roadway and road users in accordance with aspects of the disclosure.

FIG. 4 is an example top-down view of a section of roadway 400 corresponding to the map information 200. In this regard, the shape, location, and other characteristics of lane lines 410, 412, 414, 416, 418, lanes 420, 422, 424, 426, and bicycle lane 440 correspond to those of lane lines 210, 212, 214, 216, 218, lanes 220, 222, 224, 226, and bicycle lane 240. In this example, the autonomous vehicle 100 is located in lane 426. The perception system 174 may detect the vehicle 450 in lane 424 and bicyclist 460 in bicycle lane 440. In this regard, the perception system 174 may provide the planning system 168 with information about the position and bounding boxes for the vehicle 450 and bicyclist 460. As noted above, the precision of the measurements of each of these bounding boxes may be represented as a distribution of possible values having a mean and standard deviation which may suggest how much smaller the bounding box or polygon could be relative to the vehicle and the bicyclist, respectively.

Figure 5:
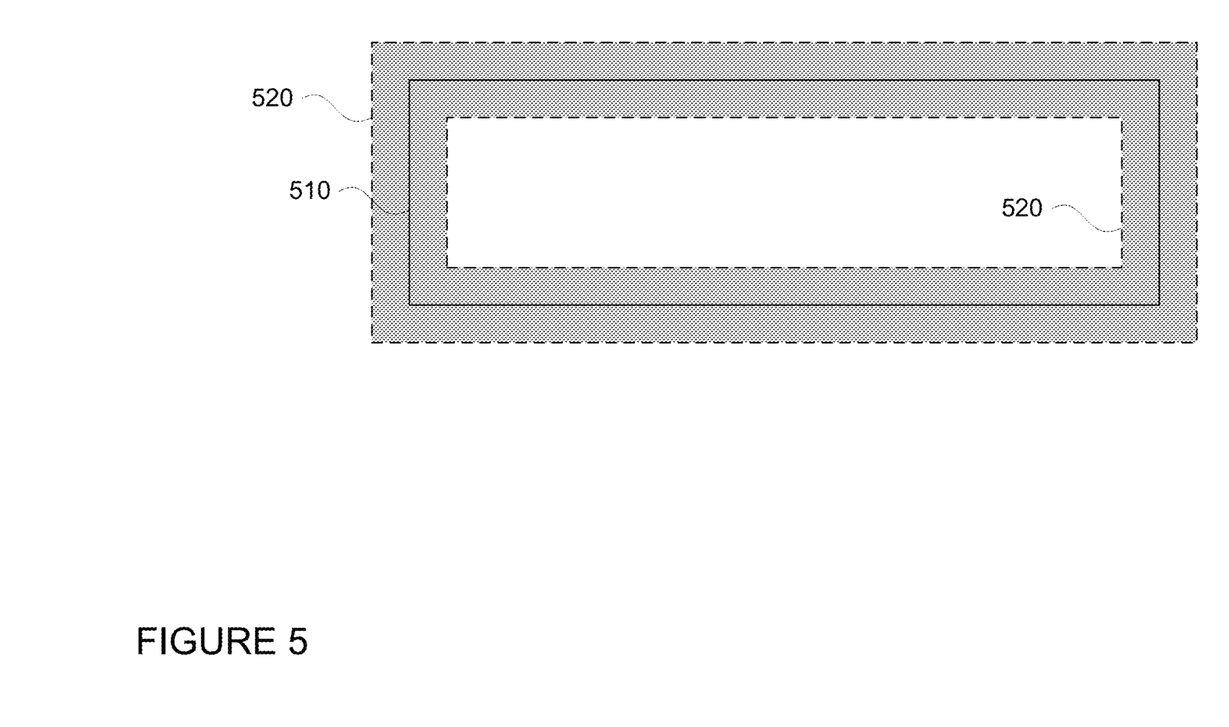
FIG. 5 is an example representation of a bounding box for an object in accordance with aspects of the disclosure.

FIG. 5 is an example representation of a bounding box 510 for an object such as the vehicle 450 or bicyclist 460. The dashed-line and shaded area 520 represents an error distribution or a distribution of possible sizes of the bounding box (being larger or smaller than the bounding box 510) corresponding to the precision of the bounding box 510.

Figure 6:
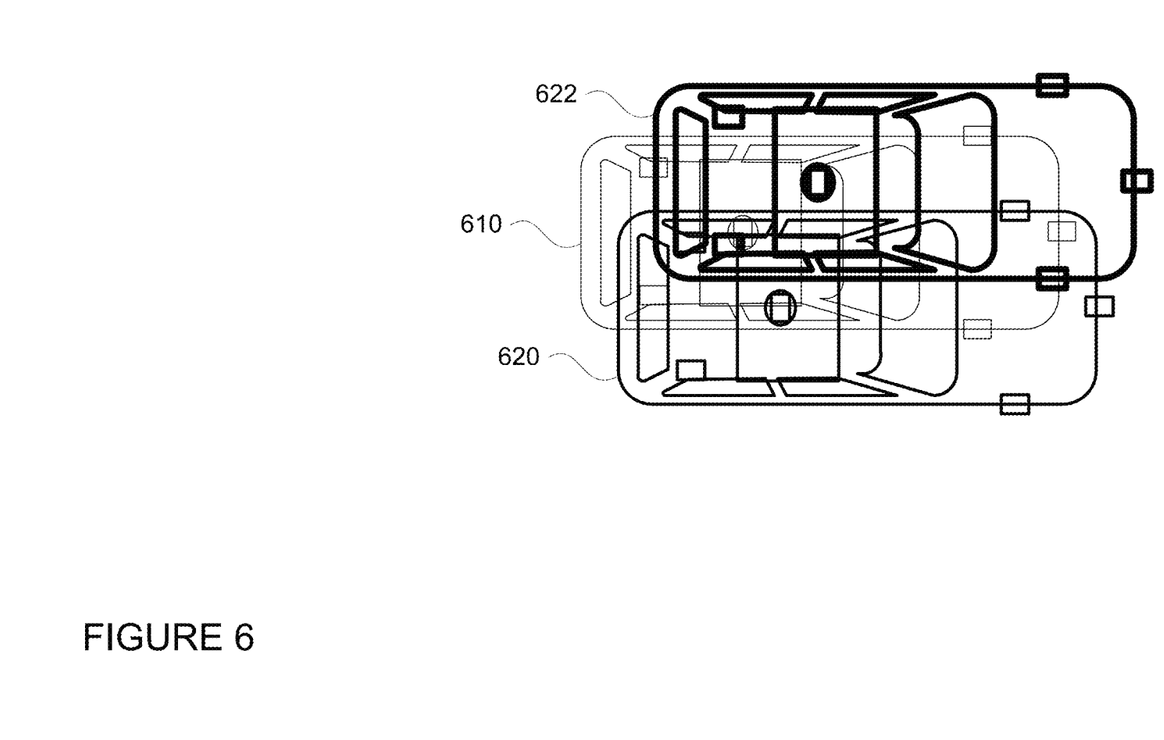
FIG. 6 is an example representation of a vehicle at its actual location as compared to a range of expected locations in accordance with aspects of the disclosure.

In addition, the difference between the autonomous vehicle's estimated and actual location in the world may be defined as the autonomous vehicle's cross-track error. For instance, the computing devices 110 and/or positioning system 170 may determine the autonomous vehicle's cross-track error as a distribution or statistical model of where the autonomous vehicle currently is versus where the autonomous vehicle planned to be based on location information generated by the positioning system 170 as described above. Such differences may be due to imperfect controls (e.g. actuation of commands) and/or an imperfect positioning system. In this regard, the mean and standard deviation of the cross-track error may be determined. In some instances, the cross-track error may be defined for the autonomous vehicle's current location. In other instances, a single cross-track error value, such as an upper bound on cross-track error, may be determined for the autonomous vehicle's current location as well as an entire trajectory based on the maximum speed and acceleration for that trajectory. For example, FIG. 6 is an example representation of the autonomous vehicle 100 at its actual location 610 as compared to a range of expected locations between location 620 and location 622. The differences between the actual location and the range of expected locations may represent a cross-track error (exaggerated greatly here for ease of understanding) defined as an error distribution over the different possible expected locations of the autonomous vehicle. In some examples, the cross-track error may be limited to only certain directions, such as only lateral error values, for simplicity and ease of implementation.

Figure 7:
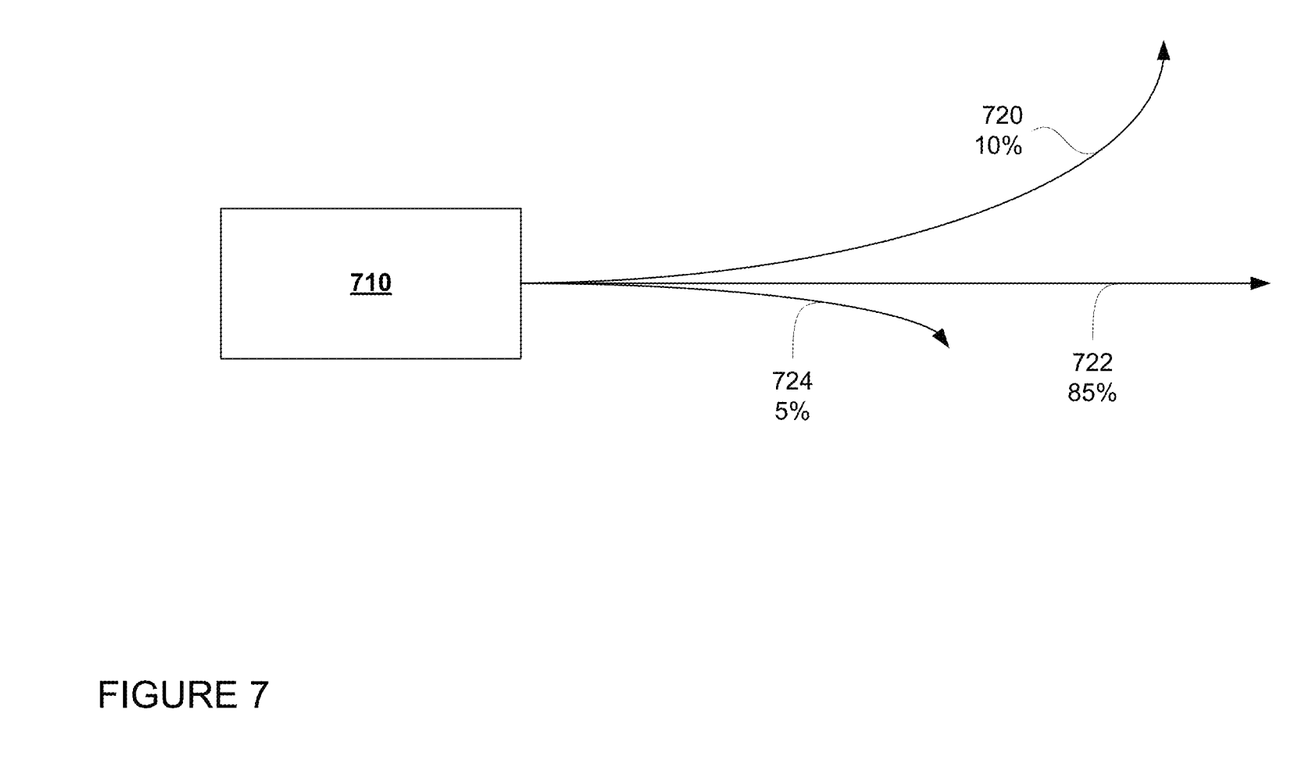
FIG. 7 is an example representation of a plurality of different possible trajectories for an object in accordance with aspects of the disclosure.

In addition, for each detected road user object, based on the output of the perception system 174, the behavior prediction system 176 may output a prediction of where the object is expected to be at various points in time in the future. In this regard, for each road user object, the behavior prediction system 176 may output multiple behavior predictions with individual likelihoods. For example, FIG. 7 represents a plurality of different possible trajectories 720, 722, 724 for an object 710 which may correspond to the vehicle 450 or the bicyclist 460. Each of these individual trajectories may be considered a behavior prediction for the object 710 with a corresponding likelihood (e.g. 5%, 85%, 10%, respectively) of the object proceeding according to that trajectory. The behavior prediction error or uncertainty of these predictions may generally increase over time (e.g. into the future). In this regard, the error in the behavior predictions may be defined as an error distribution or a Gaussian distribution over time with mean and standard deviations at each point in time.

Figure 8:
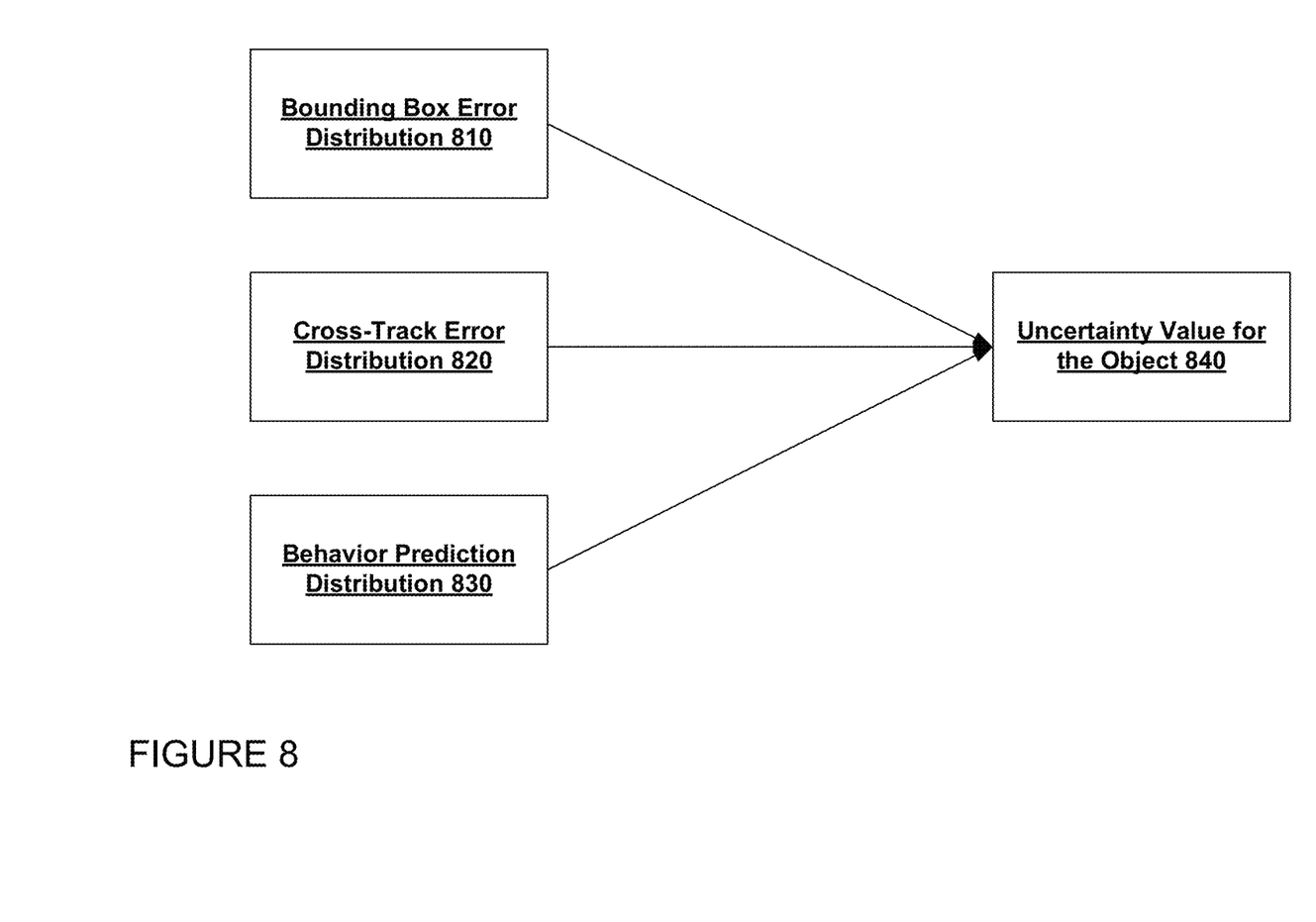
FIG. 8 is an example representation of how three error values or distributions can be combined into an uncertainty value in accordance with aspects of the disclosure.

Returning to FIG. 10, at block 1020, an uncertainty value is determined for the object by combining the first error value, the second error value, and the third error value. The distributions for each of these values (e.g. error values) may be combined in any number of ways to determine an uncertainty for an object. For example, if the distributions are all Gaussian distributions, the mean and standard deviations may be combined statistically. As such, these may be combined by summing the means and by taking the square root of a sum of squares of the standard deviations. FIG. 8 is an example representation of how three error values or distributions, one from each of the bounding box error distribution 810 for the object, the cross-track error distribution 820 for the autonomous vehicle, and the behavior prediction error distribution 830 for the object are combined into an uncertainty value 840.

An example way in which to combine the means mathematically would be:

$$\mu_{total} = \mu_1 + \mu_2 + \mu_3$$

In this example, $\mu_1$ may be a first error value (e.g. mean bounding box error of the bounding box error distribution), $\mu_2$ may be a second error value (e.g. mean cross-track error of the cross-track error distribution), and $\mu_3$ may be a third error value (e.g. mean behavior prediction error of the behavior prediction error distribution). As such, $\mu_{total}$ may be an uncertainty value as described above.

An example way in which to combine the standard deviations mathematically would be:

$$\sigma_{total} = \sqrt{(\sigma_1^2 + \sigma_2^2 + \sigma_3^2)}$$

In this example, $\sigma_1$ may be a first error value (e.g. standard deviation of the bounding box error distribution), $\sigma_2$ may be a second error value (e.g. standard deviation of the cross-track error distribution), and $\sigma_3$ may be a third error value (e.g. standard deviation of the behavior prediction error distribution). As such, $\sigma_{total}$ may be an uncertainty value as described above.

Returning to FIG. 10, at block 1030, a lateral gap threshold is determined for the object based on the uncertainty value. For instance, this uncertainty may be added to a baseline lateral gap threshold for the type of the object (e.g. vehicle, pedestrian, bicyclist, etc.) in order to determine a lateral gap threshold. Each baseline lateral gap threshold may be determined by human operators based on acceptable driving behaviors for the autonomous vehicle. Moreover this baseline lateral gap threshold may be adjusted based on the driving situations using heuristics or machine learning to approximate socially acceptable human driving behaviors. For example, it may be more acceptable to get closer to a pedestrian in an urban environment (e.g. a busy city such as San Francisco or New York City) versus a suburban environment (e.g. a quiet street with few other cars or pedestrians). As another example, because there may be less certainty about controlling an autonomous vehicle during certain weather conditions like precipitation (e.g. rain, snow, sleet, etc.), a baseline lateral gap threshold for a particular type of object and/or driving environment may be larger or increased by a fixed value when it is raining, snowing, etc. In addition, lateral gap thresholds may be defined for different purposes such as avoiding collisions, comfort separation, slowing down, etc.

Figure 9:
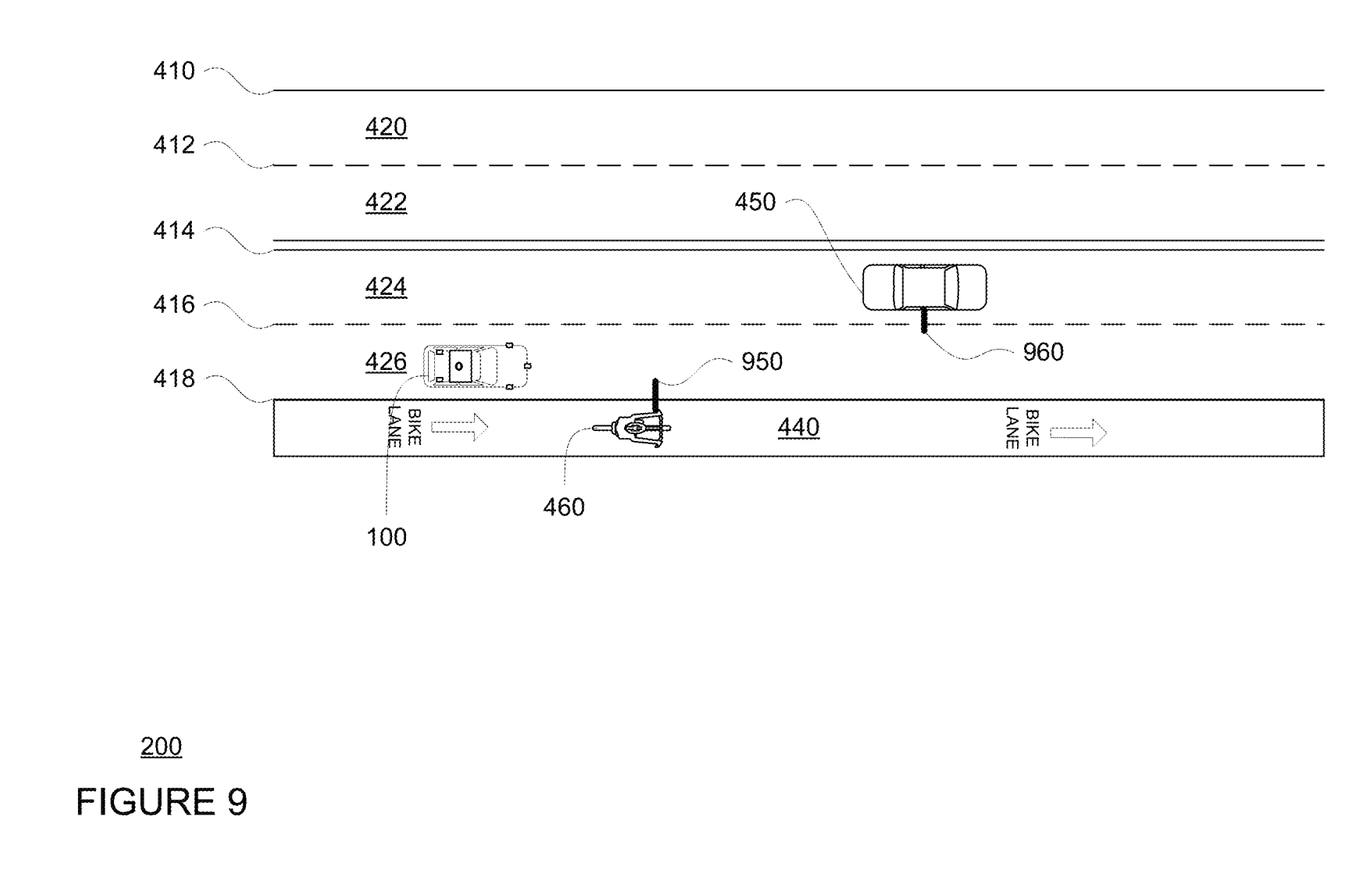
FIG. 9 is an example representation of map information, an autonomous vehicle, a bicyclist and data in accordance with aspects of the disclosure.

Confidence values for the lateral gap thresholds for each object may be determined based on an expected interaction rate (e.g. how often the autonomous vehicle is expected to encounter a particular type of road user) and a maximum number of interactions that do not meet the lateral gap threshold. The expected interaction rate may be determined offline from analysis of historical driving information in the same, similar, or all geographic locations to identify how often autonomous vehicles come within a predetermined distance of (e.g. within 2 meters or more or less) of each type of road user. In this regard, a confidence value may represent a percentage of interactions with a particular type of object during which the autonomous vehicle may not meet the lateral gap threshold. In other words, the confidence value defines a rule that the autonomous vehicle maintains a lateral gap to external objects such that the predicted incidents per mile of not maintaining this lateral gap due to uncertainty does not exceed the confidence value. For example, for 97 percent of interactions with bicyclists, the autonomous vehicle will come no closer than 36 inches (3 feet) to bicyclists. The interaction threshold (here, 97 percent) may be determined by human operators based on performance requirements for the autonomous vehicle. The 92-centimeter value may be the lateral gap threshold determined as described above. In this regard, confidence values may be different for different types of objects having different uncertainties as determined above. For instance, FIG. 9 represents example lateral gap thresholds 950, 960 (depicted in distance only for clarity and ease of understanding) for the vehicle 450 and the bicyclist 460.

Returning to FIG. 10, at block 1040, the autonomous vehicle is controlled in an autonomous driving mode based on the lateral gap threshold for the object. The planning system 168 may then attempt to solve for a trajectory that maintains the confidence value as well as other typical constraints (e.g. following lanes, following traffic controls, following speed limits, meeting acceptable acceleration and deceleration thresholds, following a route, etc.). For instance, the planning system 168 may attempt to ensure that it is at least as confident as the confidence value that the autonomous vehicle will not violate the lateral gap threshold for the object given the current uncertainties. For example, the planning system may attempt to solve for or find a trajectory which satisfies both the lateral gap threshold 950 and the lateral gap threshold 960. If a trajectory can be found, this trajectory can be used to control the autonomous vehicle in an autonomous driving mode. For instance, as noted above, the computing devices 110 may control the various systems of the autonomous vehicle 100 in order to cause the autonomous vehicle to follow the trajectory towards the destination.

If a trajectory cannot be solved for or found, certain components of the constraints, including the confidence value, can be adjusted. For example, the confidence value can be adjusted by reducing the lateral gap threshold (e.g. by adjusting the baseline lateral gap threshold) component of the confidence value. In this regard, the lateral gap threshold can be adjusted until a trajectory can be solved for or found. How and which components are adjusted may be determined by human operators based on a combination of safety considerations, legal restrictions (e.g. speed limits but also avoiding careless or reckless driving situations), and the desire for the autonomous vehicle to make progress along a route. Such adjustments can continue until a trajectory can be found and used to control the autonomous vehicle in an autonomous driving mode.

The lateral gap thresholds described herein may be combined with speed considerations as well. For instance, once the lateral gap threshold is determined, a slow region may be added around this area as well which may be implemented as a hard (inflexible) rather than a soft (can be adjusted) constraint. As another instance, the trajectory planning may include a constraint with a proximity required lateral gap. This is a mapping between the lateral gap threshold and speed which can be implemented as a soft constraint which can be adjusted in order to solve for a trajectory.

The lateral gap thresholds described herein may also be used in other situations involving autonomous vehicles, such as those used in warehouses and other non-roadway situations. For instance, while the trajectory planning in such situations might be different, the features herein may still be used to implement lateral gap thresholds. While, there might not be a "comfort" notion in a lights-out warehouse (e.g. in a warehouse with no human occupants there's no comfort/human perception to for which to optimize), predicted collision rates, rates of robots getting stuck (e.g. while blocking each other's paths), and potentially the estimated cost of damage to each robot's cargo (e.g. a robot carrying clothing might have a lower-cost collision than a robot carrying fragile electronics) may all be taken into consideration.

The features described herein may allow autonomous vehicles to plan for lateral gaps between autonomous vehicles and other objects in order to control such autonomous vehicles in a safe and practical manner. In addition, the features described herein may provide many other benefits. For instance, if the lateral gap threshold component of the confidence values is becoming very large, this may be a signal that there is a problem with the inputs to that component. Moreover, by reviewing the calculation of the uncertainty value, the system which is causing the problem may be readily identified and efforts to improve this system can be focused accordingly. For example, if there are 3 input systems A, B and C, and system C's error modeling adds up to 85% of the final gap computation's value, efforts (e.g. time, labor, and other resources) may be focused on improving system C. In some instances, problems with such systems can be identified in real time and potentially addressed immediately. In addition, as the perception, positioning, and behavior prediction systems improve (e.g. become more precise), the features described herein take advantage of these improvements automatically as the lateral gap threshold will be reduced and the autonomous vehicle will be able to make more progress, at faster speeds, in narrower situations, while maintaining the same level of safety.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for controlling an autonomous vehicle, the method comprising:
    receiving, by one or more processors, a first error value associated with a boundary of an object, a second error value associated with a location of the autonomous vehicle, and a third error value associated with a predicted future location of the object;
    determining, by the one or more processors, a total error value by summing the first error value, the second error value, and the third error value together;
    determining, by the one or more processors, a lateral gap threshold for the object based on the total error value and a baseline lateral gap threshold, wherein the baseline lateral gap threshold defines a margin of safety for driving next to the object; and
    controlling, by the one or more processors, the autonomous vehicle in an autonomous driving mode based on the lateral gap threshold for the object.

2. The method of claim 1, wherein the first error value, the second error value, and the third error value are standard deviation values.

3. The method of claim 1, further comprising taking a square root of a sum of squares of the first error value, the second error value, and the third error value.

4. The method of claim 1, wherein the first error value, the second error value, and the third error value are mean values.

5. The method of claim 1, wherein determining the lateral gap threshold includes: adding the total error value to the baseline lateral gap threshold.

6. The method of claim 1, further comprising determining the baseline lateral gap threshold based on current driving conditions.

7. The method of claim 6, wherein the current driving conditions include whether it is currently precipitating in a driving environment of the autonomous vehicle.

8. The method of claim 6, wherein the current driving conditions include whether the autonomous vehicle is driving in an urban area.

9. The method of claim 6, wherein the current driving conditions include whether the autonomous vehicle is driving in a suburban area.

10. The method of claim 1, further comprising determining the baseline lateral gap threshold based on a type of the object.

11. The method of claim 1, wherein determining the lateral gap threshold for the object further includes identifying an interaction threshold corresponding to a predetermined percentage of an expected interaction rate with objects.

12. The method of claim 11, wherein identifying the interaction threshold is based on a type of the object.

13. The method of claim 1, wherein controlling the autonomous vehicle further includes:
    attempting to solve for a trajectory that meets the lateral gap threshold for the object; and
    when a trajectory that meets the lateral gap threshold for the object cannot be solved for, adjusting the baseline lateral gap threshold to determine an adjusted lateral gap threshold until a trajectory that meets the adjusted lateral gap threshold for the object is found.

14. The method of claim 1, further comprising, prior to determining the lateral gap threshold, determining the baseline lateral gap threshold based on acceptable driving behaviors for the autonomous vehicle.

15. A system for controlling an autonomous vehicle, the system comprising one or more processors configured to:
    receive a first error value associated with a boundary of an object, a second error value associated with a location of the autonomous vehicle, and a third error value associated with a predicted future location of the object;
    determine a total error value by summing the first error value, the second error value, and the third error value together;
    determine a lateral gap threshold for the object based on the total error value and a baseline lateral gap threshold, wherein the baseline lateral gap threshold defines a margin of safety for driving next to the object; and
    control the autonomous vehicle in an autonomous driving mode based on the lateral gap threshold for the object.

16. The system of claim 15, wherein the one or more processors are further configured to determine the lateral gap threshold by: adding the total error value to the baseline lateral gap threshold.

17. The system of claim 15, wherein the baseline lateral gap threshold is determined further based on current driving conditions.

18. The system of claim 15, wherein the baseline lateral gap threshold is determined further based on a type of the object.

19. The system of claim 15, wherein the one or more processors are further configured to determine the lateral gap threshold for the object by identifying an interaction threshold corresponding to a predetermined percentage of an expected interaction rate with objects.

20. The system of claim 15, wherein the one or more processors are further configured to control the autonomous vehicle by:
   attempting to solve for a trajectory that meets the lateral gap threshold for the object; and
   when a trajectory that meets the lateral gap threshold for the object cannot be solved for, adjusting the baseline lateral gap threshold to determine an adjusted lateral gap threshold until a trajectory that meets the adjusted lateral gap threshold for the object is found.

21. The system of claim 15, wherein prior to determining the lateral gap threshold, the one or more processors are further configured to determine the baseline lateral gap threshold based on acceptable driving behaviors for the autonomous vehicle.

\* \* \* \* \*